United States Patent [19]
Norman

[11] 3,751,105
[45] Aug. 7, 1973

[54] CORNER CONSTRUCTION FOR VEHICLE TRAILERS

[75] Inventor: Noah M. Norman, Trussville, Ala.

[73] Assignee: Altamil Corporation, Birmingham, Ala.

[22] Filed: Sept. 24, 1971

[21] Appl. No.: 183,339

[52] U.S. Cl. ............. 296/28 M, 52/665, 240/7.1 R
[51] Int. Cl. ........................................... B62d 33/02
[58] Field of Search ............... 296/28 M, 28 D, 1 R, 296/10, 29, 30; 240/7.1 R, 8.1, 8.2, 8.22, 8.3; 105/410; 52/665

[56] References Cited
UNITED STATES PATENTS
3,582,640   6/1971   Ellard .......................... 240/7.1 R X
1,579,388   4/1926   Palmer ............................... 296/28 D
1,887,756   11/1932  Gurton ............................... 296/28 M
2,639,187   5/1953   Grumbache .................... 296/28 M X Primary Examiner—Benjamin Hersh
Assistant Examiner—John A. Pekar
Attorney—Hugh P. Carter et al.

[57] ABSTRACT

An "add-on" corner for the decks of flat bed trailers and the like which permits a manufacturer to produce trailers having truncated front corners while being able, on request, to furnish square cornered decks. The invention comprises a corner fill piece which may be secured to a truncated corner thus to "square" it off.

2 Claims, 4 Drawing Figures

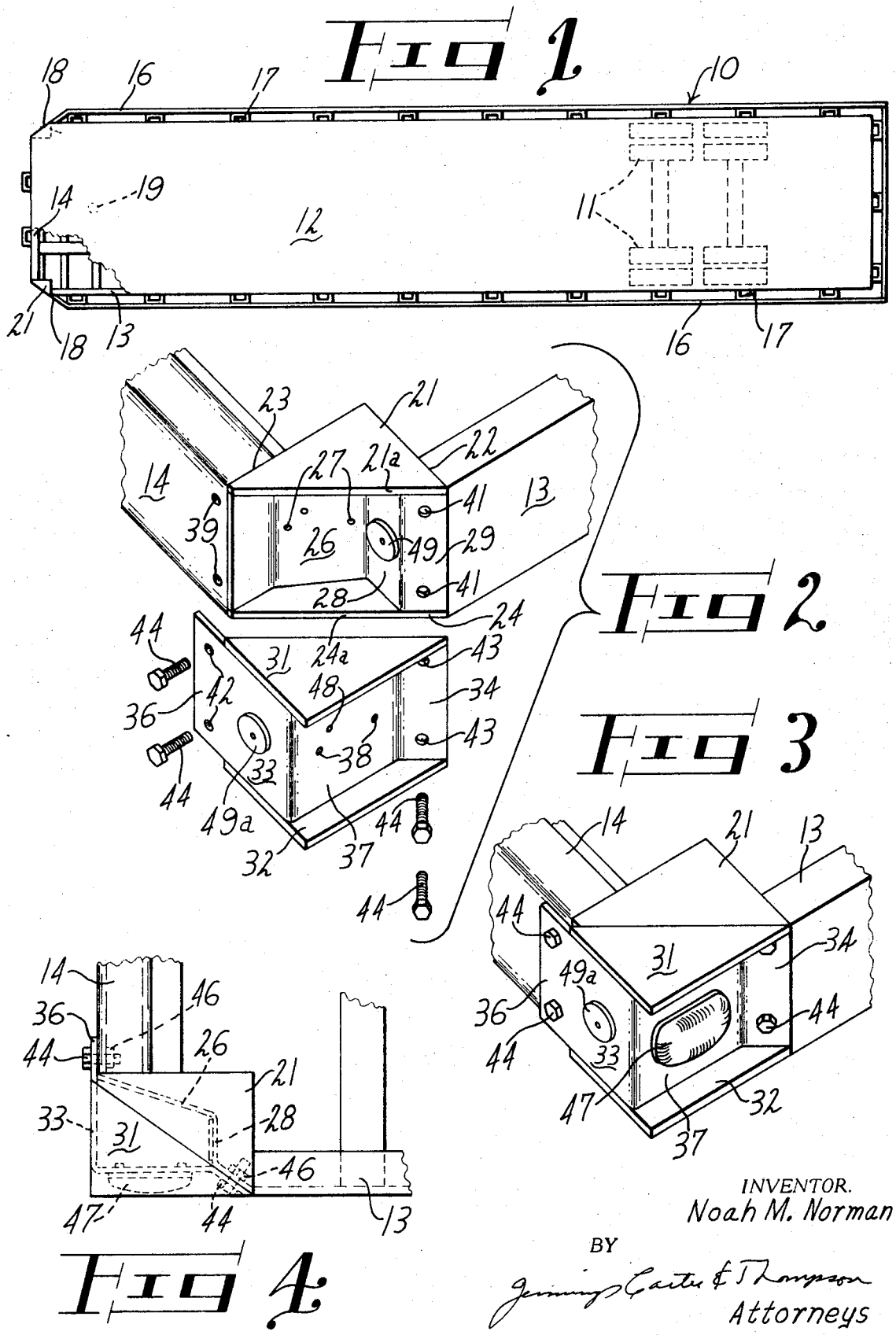

CORNER CONSTRUCTION FOR VEHICLE TRAILERS

My invention relates to corner construction for highway trailers and the like, especially of the flat bed type.

In this art, some customers require trailers having the front corners of the beds truncated. Generally, this is for clearance so that the tractor may be turned substantially at right angles to the trailer without interference between the forward corners of the trailer bed and the cab of the tractor. On the other hand, some customers require that the beds of their trailers be square at the front corners because this permits loading of full length items on the load carrying bed, all the way across the width of the trailer. From the manufacturer's standpoint, it is desirable to sell trailers from stock as distinguished from building them to order. Therefore, it often happens that a manufacturer will have in stock a number of such trailers with square cornered decks and then receive orders for truncated cornered ones, or vice versa.

In view of the above, my invention contemplates means permitting the manufacturer to fabricate all of his trailers with truncated front deck corners, and to be able to convert these to square cornered decks when required.

My invention contemplates a triangular fill piece for squaring off the truncated corners of trailer beds or decks which may be fabricated separately, ready for installation to meet the requirements of customers for the same, permitting the standardization of trailer bed constructions while providing flexibility in meeting the demands of the trade.

In one detail my invention comprises a triangular shaped corner section for a trailer bed which is predrilled to accommodate the running light on a truncated corner, whereby the light fixture may be removed, the corner piece put in place, and the light fixture installed on the corner piece.

More in detail, my invention comprises a corner piece for the truncated corner of a flat bed trailer in which the truncated corner, adjacent the side of the frame of the trailer bed, has a flat surface, my improved corner piece being provided with a flat surface adapted to mate with the flat surface of the truncated corner of the bed, together with an extending vertically disposed plate section at the opposite corner of the fitting which overlaps a portion of the end frame of the trailer bed, together with means to secure the corner fitting to the truncated corner in the areas of the flat section thereof and the extending plate portion.

My invention is illustrated in the accompanying drawings forming a part of this application in which:

FIG. 1 is a plan view of a typical flat bed highway trailer having the corners at the front end thereof truncated, a part of the deck of the trailer being broken away for the sake of clarity;

FIG. 2 if an exploded view of a fragment of the truncated corner of the trailer with my improved corner fitting in position to be installed thereon;

FIG. 3 is an isometric view showing my improved corner fitting installed and with the light fixture also in place; and, FIG. 4 is a detail fragmental plan view showing my improved fitting in place.

Referring now to the drawings for a better understanding of my invention I illustrate at 10 a typical semi-trailer for highway usage and which of course has the supporting wheels 11, a deck 12 which may be covered over with suitable planking or other material as indicated side frame members 13 and a forward, transverse end frame member 14. The trailer may be equipped with rub rails 16 and pockets 17 for stakes, or other side load containing members.

As before stated, it is often required that the forward corners 18 of the deck be truncated as indicated so that when the tractor is hitched to the kingpin 19 at the forward end of the trailer, through the usual fifth wheel carried by the tractor, not shown, the tractor may be turned substantially at right angles to the trailer for manuvering purposes. The corners 18, being cut away, provides clearance so that the cab of the tractor will not strike the corners. The disadvantage of this construction is that if one were to carry items such as long pipes and the like which he wishes to confine within the confines of the deck 12 proper, the truncation of the corners 18 does not admit of these long loads being laid on the deck, adjacent the sides of the trailer. Therefore, some operators wish to "square off" the deck so that they may completely fill the trailer with items of the maximum length of the deck 12.

While my invention may be applicable to various detailed formations of the truncated corners, I show the same in association with a truncated corner in which there is an upper triangular plate 21 butt welded along the meeting edges 22 and 23 with the respective side members 13 and 14. A lower plate 24 also is welded to the frame members 13 and 14, in abutted fashion.

The truncated corner is completed by the provision of a vertically extending plate member 26 to which, normally, a running light fixture is secured by means of openings 27 in the central portion of the plate 26. The plate 26, at the side of the trailer is bent outwardly as indicated by the numeral 28 and then is turned somewhat rearwardly to provide the plate section 29 which in effect is parallel to the edges 21a and 24a of the triangular plates 21 and 24.

My improved corner piece comprises the upper triangular shaped plate 31 and a lower triangular plate 32. A vertically extending plate 33 is welded respectively to the underside and upperside of the plates 31 and 32. The plate 33 is provided with the outturned portion 34 which is adapted to lie parallel to and closely in contact with the portion 29 of the plate 26. Further, plate 33 is provided with an extended portion 36 which is adapted to overlie the vertically extending portion of the end frame 14 of the trailer bed. It will also be noted that the triangular plates 31 and 32, on what is to become the extension of the side of the trailer, overhang the vertical portion 37 of the plate 33. Openings 38 through the portion 37 of the plate afford means to secure the base of a running light fixture, as presently will appear.

While my improved corner may be welded to the truncated corner of the trailer bed, I prefer to provide openings 39 and 41 in the truncated corner at the places indicated and to provide suitable correspondingly drilled openings 42 and 43 in the meeting portions of the vertical plate 33 of my improved corner construction. Suitable fasteners such as bolts 44 and nuts 46, shown only in FIG. 4, are used to secure my improved corner construction to the truncated corner of the trailer bed.

From what has been described it will now be seen that if it is desired to convert a truncated corner trailer bed to a squared off one, the first thing to be done is to remove the running light fixture which was secured to the plate 26 by fasteners passing through the openings 27, the fixture being shown only in FIG. 3 and indicated at 47. My improved corner fitting is now brought in place, the plate section 34 overlapping the flat outturned portion 29 of plate 26 and the extended portion 36 overlapping and overlying the adjacent vertically extending portion of the end frame member 14. The bolts 44 and the nuts 46 are put in place, thus to secure the fitting to the truncated corner. The light fixture 47 is now put in place by running screws through its base into the openings 38 and the wire may be passed through an opening 48 provided in the vertical plate 33 as indicated.

It might be mentioned, also, that it is customary to provide a reflector 49 at the place indicated in the truncated corner. Since these reflectors are relatively inexpensive, I prefer to leave the original reflector 49 on the truncated corner and simply to add another one indicated at 49a to the forward end of my improved corner fixture.

From the foregoing it will be seen that I have devised an improved fitting which may be used to square off the forward corners of a truncated cornered bed or deck of a trailer. My invention is particularly adapted, as stated, for permitting the standardization of trailer construction in which all of them are made with truncated corners and later converted to square cornered structures. By having the plates 31 and 32 extend past the plate section 37, I provide a recessed, protective mounting place for the lighting fixture 47.

While I have shown my invention in but one form, it will be obvious to those skilled in the art that it is not so limited, but is susceptible of various other changes and modifications without departing from the spirit thereof.

What I claim is:

1. The combination with the truncated corner of a trailer bed of the kind in which said corner is formed at the juncture of vertically disposed side and end frame members and in which the end of the truncated member adjacent the side frame member is defined by a vertically extending flat plate surface, of
   a. a fitting for squaring off said corner comprising a fabricated plate unit having upper and lower triangular plates the hypotenuses of which are substantially the length of the truncation of said corner,
   b. a vertical plate section for the fitting, the upper and lower edges of which are respectively welded to said horizontal triangular plates,
   c. one end of the vertical plate of the fixture being bent outwardly, thus to provide a flat plate section disposed to fit substantially flat against the vertically extending plate surface of the corner,
   d. the opposite end of said vertically extending plate of the fitting extending past the corners of the upper and lower triangular plates, thus to lie substantially flat against the adjacent vertically extending portion of the end frame of the trailer bed, and
   e. means to secure the fitting to the side and end trailer frame members in the areas of said outwardly bent and said extending portion of the vertically extending fitting plate.

2. The construction of claim 1 in which the edges of the triangular plates of the fitting defining the extended sides of the corner project outwardly of the vertical plate of the fitting, thereby to provide a side protected inset for receiving a running light fixture which may be secured to the adjacent portion of said vertically extending plate.

* * * * *